United States Patent [19]

Levy et al.

[11] 3,728,376

[45] Apr. 17, 1973

[54] CATALYTIC REDUCTION PROCESS
[75] Inventors: Joseph Levy; William Walker, both of Rutherford, N.J.
[73] Assignee: Universal Oil Products Company, Des Plaines, Ill.
[22] Filed: June 15, 1970
[21] Appl. No.: 46,513

[52] U.S. Cl. ........260/472, 260/247.2 B, 260/293.79, 260/326.3
[51] Int. Cl. ............................................C07c 101/18
[58] Field of Search ..........................260/472, 471 R

[56] References Cited

UNITED STATES PATENTS 2,689,248   9/1954   Clinton et al. ........................260/472
3,037,046   5/1962   Illich et al. ...........................260/471
  812,554   2/1906   Einhorn................................260/472
1,676,470   7/1928   Adams et al..........................260/472
2,459,217   1/1949   Cope....................................260/472

Primary Examiner—Lorraine A. Weinberger
Assistant Examiner—R. S. Weissberg
Attorney—James R. Hoatson, Jr. and Bernard L. Kramer

[57] ABSTRACT

Catalytic reduction of an ester of a nitrobenzoic acid and tertiary-amino alcohol to the corresponding amine by gradually adding the ester to an agitated suspension of noble metal catalyst in inert water immiscible solvent under hydrogen pressure. Improved yields and product purity are obtained in a more facile manner.

12 Claims, No Drawings

CATALYTIC REDUCTION PROCESS

BACKGROUND OF THE INVENTION

The reduction of nitrobenzoic esters of tertiary-amino alcohols is a well known route for the production of the corresponding amines, which have valuable local anesthetic properties and are widely used in medicines. For example, the reduction of diethylaminoethyl p-nitrobenzoate leads to the well known local anesthetic drug, Procaine. The most generally utilized methods of carrying out such reductions comprise (1) chemical reduction by means of an active metal, such as iron or zinc, in combination with either an inorganic or organic acid, such as sulfuric acid, hydrochloric acid or acetic acid, and (2) catalytic reduction of the nitrobenzoate ester in the presence of hydrogen and a catalyst either as the free base in an alcoholic or inert solvent, or as an acid salt such as the hydrochloride in aqueous or alcoholic medium.

Of these procedures, reduction with iron and dilute hydrochloric acid is still widely practiced but is cumbersome to carry out on a plant scale, involving operating difficulties in filtering the iron sludges obtained and in isolating the product. Although catalytic hydrogenation would appear to provide a much simpler method for reducing the nitro group, problems are also encountered which seriously mitigate against the utility of such procedures. Thus, the hydrogenation of acid salts of these nitro esters in aqueous or alcoholic medium often proceeds slowly and incompletely unless the nitro ester salt is carefully purified prior to reduction. This, of course, adds considerably to the cost of the process. Also, relatively large amounts of noble metal catalysts are frequently required to attain a satisfactory rate of reduction and this, too, increases the cost. Furthermore, reduction of nitro ester free bases in alcoholic medium takes place with concomitant trans-esterification of the nitro ester with the alcohol solvent, giving rise to undesirable side products and decreased yields.

Catalytic reduction of the nitro ester free base has been reported to proceed readily in aromatic solvents in the presence of a palladium catalyst. On examining this procedure, however, one finds that, whereas about 81 percent yields are obtained on a small laboratory scale, quite drastic reductions in yields are incurred as the scale of the operation is increased and the method, therefore, is unsuitable for commercial use. Accordingly, the development of a simple, economical, easily conducted method for reducing nitrobenzoic acid esters of tertiary amino alcohols in high yield would be most desirable.

DESCRIPTION OF THE INVENTION

It is the purpose of this invention to provide an improved process which avoids the objections hereinbefore set forth.

We have found that the reduction of such nitrobenzoate esters as the free bases can be carried out readily on a large scale in an inert solvent and in the presence of a noble metal catalyst to afford excellent yields of the amino esters, provided that the ester solution is gradually introduced into an agitated suspension of the catalyst in the solvent under an atmosphere of hydrogen. While we do not wish to be held to any specific explanation for the efficacy of this process, it is considered that the incremental addition of the nitro ester solution at such a rate that it is reduced rapidly and completely, minimizes hydrolysis of the nitro ester by the water formed in the mixture from reduction of the nitro group. We have found, for example, that diethylaminoethyl p-nitrobenzoate is highly sensitive to the presence of water, readily undergoing hydrolysis particularly at elevated temperatures. Accordingly, during the course of the reduction, the water formed in the reaction acts to hydrolyze some of the as yet unreduced nitro ester resulting in decreased yield and impure products.

In small scale batch type reductions, which are rapidly completed, the amount of hydrolysis is minimal and, as noted above, yields of about 81 percent of theory of the desired amino ester are obtained. However, on a large scale such reductions are necessarily prolonged, thereby subjecting a considerable portion of the charged nitro ester to the action of the water produced. Hydrolysis, therefore, becomes increasingly prominent and considerable losses are so incurred. This can be easily demonstrated even on a small scale by arbitrarily prolonging the reduction by limiting the amount of hydrogen admitted to the reaction vessel.

Not only are excellent yields of the amino ester obtained by the process of this invention but the reaction is easily carried out on an industrial scale. The nitro ester need not be purified prior to reduction. The solution of the ester obtained from the reaction of the nitro benzoic acid with the amino alcohol in the presence of an inert solvent, such as xylene, is extracted with aqueous caustic for recovery of unreacted acid and then used directly for the reduction without isolation or further purification. Other solvents for the ester which are inert to the conditions of the reductin such as halogen, alkyl and alkoxy substituted aromatic solvents, aliphatic ethers, esters, etc., may also be used but generally offer no advantages.

The hydrogenation proceeds readily at hydrogen pressures which may range from atmospheric to about 100 psi and temperatures of ambient to about 100°C., although higher pressures and temperatues may be used if desired. For economical reasons, it is preferred to utilize the lowest temperature and pressure which are suitable for the purpose and, accordingly, higher temperature or higher pressure will be used only if advantages appear therefor. A relatively low amount of catalyst of from about 0.5 percent to 1.5 percent based on the weight of ester usually is sufficient to give a satisfactory rate of reduction but larger amounts of catalyst may be used and generally will not exceed about 15 percent by weight. The recovered catalyst is found to retain considerable activity so that it can be reused in the process. The well known noble metal catalysts, such as platinum, palladium, rhodium, ruthenium, etc. may be used for this reduction. The preferred catalyst is 5 percent palladium deposited on carbon. It is understood that other suitable carriers may be used, such as alumina, silica, etc. The supported catalyst generally is preferred and may contain from about 1 percent to about 25 percent or more by weight of the noble metal.

In another embodiment of the invention, activated carbon is added to the reaction zone. It has been found that the addition of the decolorizing carbon appears to prolong the life of the catalyst and thus permits longer utilization of the catalyst. The amount of activated charcoal may range from 0.5 to 10 times the weight of the supported noble metal catalyst. The activated charcoal also appears to permit the use of a lower amount of catalyst, either originally or in subsequent runs.

The process of the invention also possesses a marked advantage over procedures of the prior art in that it is readily controlled and safe to operate on a plant scale. The hydrogenation of nitro compounds is well known to be very exothermic and, therefore, frequently hazardous and difficult to control on an industrial scale. The process of this invention, however, enables the addition of the nitro ester to be conducted at the desired rate so as to permit the heat of the reaction to be readily dissipated. Isolation of the amino ester is also easily accomplished by simple extraction into aqueous acid, such as hydrochloric acid, from which the amino ester hydrochloride can be crystallized by conventional means. This invention, therefore, provides a highly economical, efficient, safe, and easily conducted process for the reduction of nitrobenzoic acid esters of tertiary-amino alcohols.

The nitrobenzoic acid esters of tertiary-amino alcohols which may be used in the process of this invention conform to the following general formula

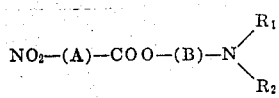

in which A is a phenyl nucleus which may be substituted with lower alkyl (1–5 carbon atoms), lower alkoxy (1–5 carbon atoms), and halogen groups and in which the nitro group may be attached in any of the available open positions, B is a straight or branched chain alkylene group of 2 to 5 carbons, and $R_1$ and $R_2$ are lower alkyl or when taken together with the nitrogen atom comprise a cyclic amino group selected from piperidine, pyrrolidine and morpholine groups.

Examples of such nitrobenzoate esters are diethylaminoethyl p-nitrobenzoate, dimethylaminoethyl o-nitrobenzoate, dipropylaminoethyl m-nitrobenzoate, dibutylaminoethyl p-nitrobenzoate, 3-dibutylaminopropyl p-nitrobenzoate, 3-diethylaminopropyl p-nitrobenzoate, diethylaminoisopropyl p-nitrobenzoate, 4-diethylaminobutyl p-nitrobenzoate, diethylaminoethyl o-chlor-p-nitrobenzoate, diethylaminoethyl o-methyl-p-nitrobenzoate, diethylaminoethyl o-methoxy-p-nitrobenzoate, piperidinoethyl o-nitrobenzoate, piperidinoethyl o-nitrobenzoate, pyrrolidinoethyl p-nitrobenzoate, morpholinoethyl p-nitrobenzoate, etc.

The hydrogenation is effected in any suitable apparatus, which may be an autoclave or other suitable closed zone, equipped with suitable stirring and heating means and provided with suitable inlet and outlet means. Following completion of the reaction, the reaction products are filtered to remove the catalyst and then processed in a conventional manner as desired. For example, the amino ester may be extracted with an aqueous hydrochloric acid solution to form the Procaine hydrochloride.

As hereinbefore set forth, it will be seen that the present invention provides a novel process in which improved yields and product purity are obtained in a more facile manner. The improvements require the gradual introduction of the ester solution in order to avoid hydrolysis of the nitro ester by the water of reaction. The introduction of extraneous water into the system should be avoided.

The following examples are introduced to illustrate further the novelty and utility of the present invention but not with the intention of unduly limiting the same.

EXAMPLE I

This example describes the catalytic reduction of diethylaminoethyl p-nitrobenzoate and was effected in the following manner. To a 1-liter stirred autoclave were charged 130 g. xylene, 2.4 g. 5 percent palladium-carbon catalyst and 4.8 g. decolorizing carbon. The mixture was heated to about 80°–90°C. and pressured with hydrogen to about 30 psi, after which 544 g. of a xylene solution of diethylaminoethyl p-nitrobenzoate was gradually fed into the autoclave during a period of about 7 hours while maintaining the temperature and hydrogen pressure at about the levels indicated. The xylene solution of the nitro ester had been prepared from 900 g. xylene, 464 g. p-nitrobenzoic acid and 310 g. diethylaminoethanol to give a total of 1,557 g. of nitro ester solution, after it had been extracted with aqueous caustic to recover 89.3 g. unreacted p-nitrobenzoic acid. Assuming that the 374.7 g. reacted p-nitrobenzoic acid had been quantitatively converted to diethylaminoethyl p-nitrobenzoate, the ester solution contained 38.4 percent nitro ester.

At the conclusion of the reduction, the autoclave was cooled to about 50°C. and the contents removed and filtered to recover the catalyst. The light amber xylene solution of the amino ester (i.e., Procaine base) was then extracted with 160 g. water plus 80 g. 32 percent hydrochloric acid, and the extract worked up by conventional means to yield 173.7 g. Procaine hydrochloride (M.P. = 155°–157°C.) as colorless crystals. From the mother liquors 15.5 g. Procaine base was then recovered by adding aqueous sodium hydroxide. The yield of Procaine HCl was 81.5 percent of theory calculated on consumed p-nitrobenzoic acid and the free base was 9.5 percent of theory for a total yield of 91 percent of theory.

EXAMPLE II

Previously used palladium-carbon catalyst was reused for additional hydrogenation in the following manner. To a 1-liter stirred autoclave were charged 130 g. xylene and 6.0 g. 5 percent Pd-carbon catalyst recovered from a previous hydrogenation. 462 g. of xylene solution of diethylaminoethyl p-nitrobenzoate was then gradually added during about 12 hours under a hydrogen pressure of about 30 psi and a temperature of about 50°C. The nitro ester solution had been prepared from 2,700 g. xylene, 974 g. p-nitrobenzoic acid and 620 g. diethylaminoethanol to yield 3,809 g. solution after 218 g. unreacted p-nitrobenzoic acid had been removed by extraction with aqueous sodium hydroxide. The 462 g. of solution charged into the reduction, therefore, contained 148 g. (0.548 moles) nitro ester, assuming quantitative conversion of the consumed p-nitrobenzoic acid to the ester. After completion of the addition, the mixture was held at temperature for an additional hour and then removed from the autoclave and filtered to recover the catalyst. The practically colorless solution of the amino ester (i.e., Procaine base) was then extracted into 92 g. water plus 71 g. 32 percent hydrochloric acid and the extract worked up by conventional means to yield 123 g. Procaine Hydrochloride as colorless crystals melting at 156°–158°C. From the mother liquor 13 g. Procaine base was recovered by treatment with aqueous sodium hydroxide and this was further converted to 10.5 g. colorless Procaine Hydrochloride also melting at 156°–158°C. The total yield of Procaine HCl was therefore 133.5 g. (0.488 moles) or 89 percent of theory (overall on consumed p-nitrobenzoic acid).

EXAMPLE III

This example is presented to illustrate the deleterious effect of intentionally prolonging a batch type reduction in the presence of water by arbitrarily limiting the admission of hydrogen to the reaction vessel.

150 g. of solution of diethylaminoethyl-p-nitrobenzoate in xylene (28.4 percent – 0.16 moles) were charged to a Parr hydrogenator along with 14 g. water and 1.5 g. 5 percent Pd-carbon catalyst. The temperature was then raised to about 50°C. and the reduction carried out during a period of 16 hours by admitting 2–3 psi of hydrogen at hourly intervals until absorption of hydrogen ceased. A total of 33.5 psi of hydrogen was taken up, which corresponds to about 0.42 moles of hydrogen or about 87.5 percent of the theoretical amount required to completely reduce the nitro ester. After filtering the catalyst, 18 g. 32 percent hydrochloric acid were added and the aqueous acid layer separated and worked up for isolation of Procaine Hydrochloride. There were obtained 22.2 g. (0.0815 moles) melting from 152°–258°C. On adding aqueous sodium hydroxide to the mother liquors a gummy oil separated which could not be crystallized. The yield of Procaine, HCl, therefore was only 51 percent of theory.

EXAMPLE IV

A xylene solution of dibutylaminopropyl p-nitrobenzoate is recovered from the esterification of p-nitrobenzoic acid with dibutylaminopropanol. The xylene solution is hydrogenated in substantially the same manner as described in Example I to form dibutylaminopropyl p-aminobenzoate, the sulfate of which is known as Butacaine sulfate.

We claim as our invention:

1. A process for the catalytic reduction to the corresponding amine of an ester of a nitrobenzoic acid and a tertiary amino alcohol, which comprises adding said ester gradually to an agitated suspension of a noble metal catalyst in an inert water immiscible solvent under a hydrogen pressure at such a rate that said ester is reduced rapidly and completely.

2. The process of claim 1 effected in the absence of added water.

3. The process of claim 1 effected in the presence of added carbon.

4. The process of claim 1 in which said nitrobenzoic acid is p-nitrobenzoic acid.

5. The process of claim 1 in which said tertiary amino alcohol is a di-lower-alkyl-amino alkanol containing from 2 to 5 carbon atoms in the alkanol moiety.

6. The process of claim 5 in which said tertiary amino alcohol is diethylaminoethanol.

7. The process of claim 5 in which said tertiary amino alcohol is dibutylaminopropanol.

8. The process of claim 1 in which said solvent is xylene.

9. The process of claim 1 in which said catalyst is palladium-carbon.

10. The process of claim 1 in which said catalyst is platinum-carbon.

11. The process of claim 1 in which said hydrogen pressure is from atmospheric to about 100 psi.

12. The process of claim 1 in which the reduction is effected at a temperature of from ambient to about 100°C.

* * * * *